United States Patent
Khire et al.

(10) Patent No.: US 11,700,334 B2
(45) Date of Patent: Jul. 11, 2023

(54) METHOD AND SYSTEM FOR MAKING CONTEXT BASED ANNOUNCEMENTS DURING A COMMUNICATION SESSION

(71) Applicant: Avaya Management L.P., Durham, NC (US)

(72) Inventors: Aparna Khire, Pune (IN); Nitinkumar Yemul, Pune (IN); Dinesh Mude, Pune (IN); Sameer Sohani, Pune (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/122,341

(22) Filed: Dec. 15, 2020

(65) Prior Publication Data
US 2022/0191330 A1 Jun. 16, 2022

(51) Int. Cl.
*H04M 3/56* (2006.01)
*H04N 7/15* (2006.01)

(52) U.S. Cl.
CPC .......... *H04M 3/568* (2013.01); *H04M 3/563* (2013.01); *H04N 7/157* (2013.01)

(58) Field of Classification Search
CPC .......... H04M 3/56–569; H04M 2203/50–509; H04N 7/157
USPC ............ 370/259–271, 351–357; 379/201.01, 379/202.01–207.01, 265.01–266.1, 379/142.01–142.18; 709/201–207, 709/217–248; 348/14.01–14.16
See application file for complete search history.

(56) References Cited

U.S. PATENT DOCUMENTS

| | | | |
|---|---|---|---|
| 7,933,391 B1* | 4/2011 | Gentle | H04M 3/4872 379/88.23 |
| 8,116,439 B1* | 2/2012 | Runcie | H04M 3/20 379/88.12 |
| 8,363,808 B1* | 1/2013 | Bland | H04M 3/566 379/202.01 |
| 2007/0156811 A1* | 7/2007 | Jain | H04L 12/1827 709/204 |
| 2007/0184857 A1* | 8/2007 | Pollock | H04W 4/18 455/466 |
| 2011/0299668 A1* | 12/2011 | Davies | H04M 3/428 379/88.12 |

(Continued)

FOREIGN PATENT DOCUMENTS

EP 2544427 1/2013

OTHER PUBLICATIONS

Extended Search Report for European Patent Application No. 21214659.1, dated May 13, 2022 6 pages.

*Primary Examiner* — Hemant S Patel
(74) *Attorney, Agent, or Firm* — Sheridan Ross P.C.

(57) ABSTRACT

A method, system, device to play context-based announcement to specific participants during an active communication session. The method includes receiving a context-based announcement for a participant while the participant is in the active communication session. The method also includes monitoring the communication session, to determine a time when the context-based announcement should be played to the participant. The method further includes playing the context-based announcement to the participant at the determined time. The method may also include displaying to the participant a visual alert associated with the context-based announcement, the visual alert may include controls that allows the participant to select when the announcement is played.

17 Claims, 9 Drawing Sheets

(56) References Cited

U.S. PATENT DOCUMENTS

2012/0203538 A1     8/2012   Tamosevicius et al.
2020/0380951 A1* 12/2020   Vuppaladhadiam ........................ H04M 3/42391

* cited by examiner

Auto configuration to play background audio as announcement – e.g. fire Alarms etc.

Host controlled configuration to play background audio as announcement – e.g. in case of consecutive meeting updates.

METHOD AND SYSTEM FOR MAKING CONTEXT BASED ANNOUNCEMENTS DURING A COMMUNICATION SESSION

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for context-based announcements played during a communication session and particularly to improving the time when an announcement is played.

BACKGROUND

Interactions are increasingly becoming more virtual. For example, schools and business are increasing the use of conferencing to connect users. Students may attend lectures virtually and employees may interact virtually via different conferencing solutions. Currently available conferencing applications do not have the capability to play user specific announcements. For example, an announcement may be for one or more, but not all participants engaged in an active communication session, current systems have no way to broadcast an announcement only to intended users. Furthermore, current systems have no way to determine the most optimal time (e.g., when no one is speaking) to broadcast an announcement. Users currently have to depend on external services (e.g., email, SMS, etc.) to receive announcements/updates (e.g., an update regarding a cancelation of a consecutive session, an update regarding a new time for a meeting, an update regarding an upcoming speaker, etc.). Therefore, attendees need to continuously monitor different services to receive important and time sensitive updates.

SUMMARY

These and other needs are addressed by the various embodiments and configurations of the present disclosure. The present disclosure can provide a number of advantages depending on the particular configuration. These and other advantages will be apparent from the disclosure.

Currently available conferencing applications do not have the capability to play user specific announcements. Users currently have to depend on services external to the conferencing service to receive announcements/updates. Therefore, attendees need to continuously monitor different services to receive important and time sensitive updates. This is not ideal, especially for time sensitive announcements or announcements that need immediate attention. Furthermore, current systems have no way to determine when to broadcast an announcement and/or the ability to play a user specific announcement on demand. The various embodiments and configurations of the present disclosure aim to help users of conferencing systems and software to receive announcements when appropriate and in a timely manner.

The present disclosure provides a context/event driven approach to playing announcements during an active communication session (e.g., on a background audio channel, on an audio whisper channel, etc.). Examples on an active communication session include an audio call, video call, etc. In some embodiments, a virtual participant will pick up the right audio stream depending on context/events and will play announcements (e.g., pre-recorded, live, etc.). The playing of the announcements can be automatic, or host controlled, and separate configurations can be availed to define this mode. For example, if the announcement is an emergency notification, the announcement may be played automatically. For a less time sensitive announcement, the system may determine the most optimal time for playing the announcement. In yet another example, a conference host may initiate the announcement. The present disclosure notifies attendees of any active call to of any context-based announcements related to the user during the active call, and therefore, eliminates the need to monitor separate/external services. An additional advantage is that announcements may be played without interruption to the participants of the active call.

As virtual communications (e.g., audio and video conferences) become an increasing feature of communication, both professionally and personally, the ability to provide user specific announcements during active communication sessions will become increasing more important. Providing user specific announcement during an active communication session, allows users to be more focused on the current communicated session (e.g., not having to monitor external services for updates).

In some embodiments, the method and system determines whether the user's camera is activated and transmitting video, if the user has disabled his camera it may not be necessary to perform the method disclosed herein. If the user's camera is on and capturing video, the method and system monitors captured video to monitor whether the user's face with the shoulder area is being captured predominately by the camera. For example, the system may include a graphics unit that continuously monitors the user's face to ensure the user's entire face is being captured by the camera. In other words, the method and system determines a user's position to ensure that the user is positioned appropriately in front of the camera. For example, a user's head and shoulders should be predominately seen in the frame of the camera. If the user is too close to or too far away from the camera, the method and system may suggest the user move further/closer away so that the user's head and shoulders are more optimally positioned.

Additionally, or alternatively, the method and system may determine a state of illumination and inform the user whether to increase or decrease the lighting to achieve a more optimal presentation. In some embodiments, the graphics unit processes the captured image/video to determine an illumination state of the video. For example, the user may be positioned in front of a window causing the user's face to appear in shadow (e.g., darker than the rest of the image), the method and/or system may alert the user and suggest the user alter her position such that the window is no longer directly behind the user (e.g., user shifts so that the window is to the left/right of the user instead of directly behind the user). In some embodiments, the alert may comprise a visual and/or audible alert. For example, a flashing window may appear on the user's screen, or a message may be sent to the user via a whisper channel (e.g., only audible to the user and not the other participants of the video conference). Additionally, or alternatively, the alert may comprise an alert sent to the user's (e.g., contact center agent) supervisor. In some embodiments, the method and systems disclosed herein use machine learning to improve the determination of the user's position. The system recognizes a user's face (and other physical elements) and may also undergo training provided by a machine learning unit. The graphics/machine learning unit will identify a user's face and/or posture (e.g., shoulders) and check using Artificial Intelligence (AI) to determine whether the user is appropriately positioned (e.g., entirely within the camera frame) and/or whether the video/image is properly illuminated.

In some embodiments, the method and/or system may be deployed in a contact center environment, and the contact center wants to ensure that its agents are positioned properly when communicated with customers. Proper positioning will provide the customer with a better impression of the contact center and the associated enterprise represented by the contact center. If the agent is not properly position (e.g., violation) the data (e.g., alert) may be transferred to a supervisor. The supervisor may perform immediate correction during the communication session. In other embodiments, the data may be stored and used for performance reviews and/or training of other agents.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

Figure 1:
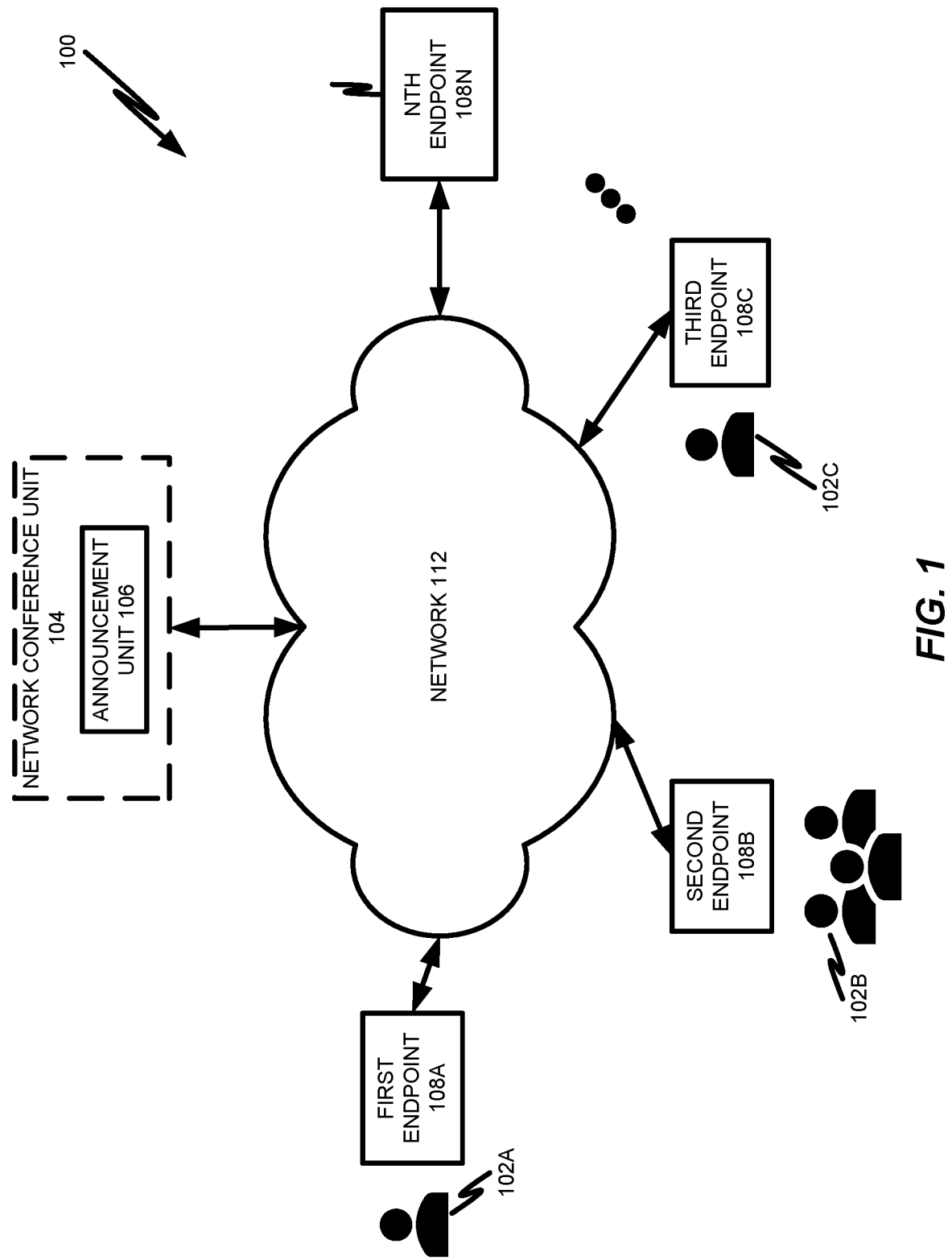
FIG. 1 depicts a system to play context-based announcements during a communication session in accordance with embodiments of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a sub element identifier when a sub element identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

The method and system disclosed herein allows context-based announcements to be played to specific users during an active communication session. The method and system disclosed herein further determines an optimal time to play the context-based announcement and/or allows a user (e.g., user to receive the announcement, a host, etc.) to manually initiate the announcement. The sending and receiving of video may be optionally utilized, and is incorporated into the embodiments provided herein.

For example, if there is an emergency notification, the system may play the emergency notification automatically. In another example, the system may determine when to play an announcement. For example, if the announcement is intended for the active speaking in a communication session (e.g., the presenter), the system may wait until the speaker is not speaking to play the announcement. Additionally, or alternatively, the method/system may provide a visual alert to the user, the visual alert may allow the user to select to play or not play the announcement. In some embodiments, the visual alert may comprise a transcription of the announcement.

The announcements are provided in real-time during an active communication session. The announcements and visual alerts may be further configured based on a user's preferences. For example, the user may select the type (e.g., visual, audible, etc.) and positioning of the alerts. In other examples, the user may completely disable announcements.

A conferencing system 100 of FIG. 1 generally includes an optional network conference unit 104 and first, second, third, . . . nth endpoints 108A-N, interconnected by a network 112. A user 102A is associated with the first endpoint 108A; users 102B are connected to a communication session via the second endpoint 108B; and a user 102C is associated with the third endpoint 108C. While the first, second, and third endpoints 108A-C are depicted, it is to be appreciated that more endpoints can be present and participating in the communication session. The conferencing system 100 can be a personal audio/video conferencing system between two users communicating one-on-one or point-to-point (in which case no MCU is required), a group audio/video conferencing system among three or more people, a mobile audio/video conferencing system involving one or more mobile endpoints and can be a software only solution, hardware only solution, or combination of software and hardware solutions.

The optional network video conference unit 104 can be any network multipoint conferencing unit ("MCU") or video conferencing server ("VCS"). During a multipoint conference session, the MCU can manage multiple endpoints at once, coordinate the audio/video data processing of the multiple endpoints, and forward the flow of media streams (e.g., audio and video) among the multiple endpoints. The MCU can conduct group audio/video conferences under the principle of mixing media streams, e.g., mixing and re-encoding participants' video conferencing streams in real time. For example, the MCU can create a picture-in-picture effect. The MCU in most applications includes a multipoint controller ("MC") and optionally one or more multipoint processors ("MPs"). The MCs can coordinate media stream processing parameters between endpoints and typically support the H.245 protocol. The MPs can process, mix and switch multimedia streams.

In contrast, a VCS often implements a multiplexing pattern of the data streams, which implies no transcoding. The VCS typically redirects the media streams of the audio/video conference participants. The compression/decompression and media stream mixing functions are generally performed in the endpoint devices.

The network conference unit 104 can service any conference topology, including a centralized conference, decentralized conference, or hybrid conference topology. Exemplary video conference units that can be modified as set forth herein include the ELITE 6000™, 6110™, 6120™, 5000™, 5105™, and 5110™ products of Avaya, Inc.

The first, second, third, . . . Nth endpoints 108A-N can be any suitable devices for providing a user interface for a voice or video conference. Some of the endpoints can be capable of hosting the voice portion of the conference only or a part of the video conference (e.g., only display images of remote participants, but not transmit an image of a local participant; or only transmit an image of a local participant, but not display images of remote participants). Alternatively, any of the endpoints 108A-N may be able to display images of remote participants and simultaneously transmit an image of the local participant. The first, second, and third endpoints 108A-C optionally display locally to the local participant images of remote participants.

Examples of suitable devices include a smart phone, cellular phone, tablet computer, phablet, laptop, personal computer, and purpose-built devices, such as the SCOPIA XT EXECUTIVE 240™, XT ENDPOINT™, XT1700™, XT4200™, XT4300™, XT5000™, XT embedded Server™, XT7000, and XT Endpoint™ with embedded server products by Avaya, Inc. that can be modified as set forth herein. In accordance with at least some embodiments of the present disclosure, the endpoint devices 108A-N may comprise any type of known communication equipment or collection of communication equipment. In general, each endpoint 108A-N may be adapted to support video, audio, text, and/or data communications with other endpoints 108. The type of medium used by the endpoint 108A-N to communicate with other endpoints 108 may depend upon the communication applications available on the endpoint 108.

The optional network conference unit 104 and first, second, third, . . . Nth endpoints 108A-N are connected by the network 112. The network 112 can be a local area network ("LAN"), a wide area network ("WAN"), a wireless network, a cable network, a telephone network, the Internet, and/or various other suitable networks in which a video conferencing system can be implemented.

Figure 2:
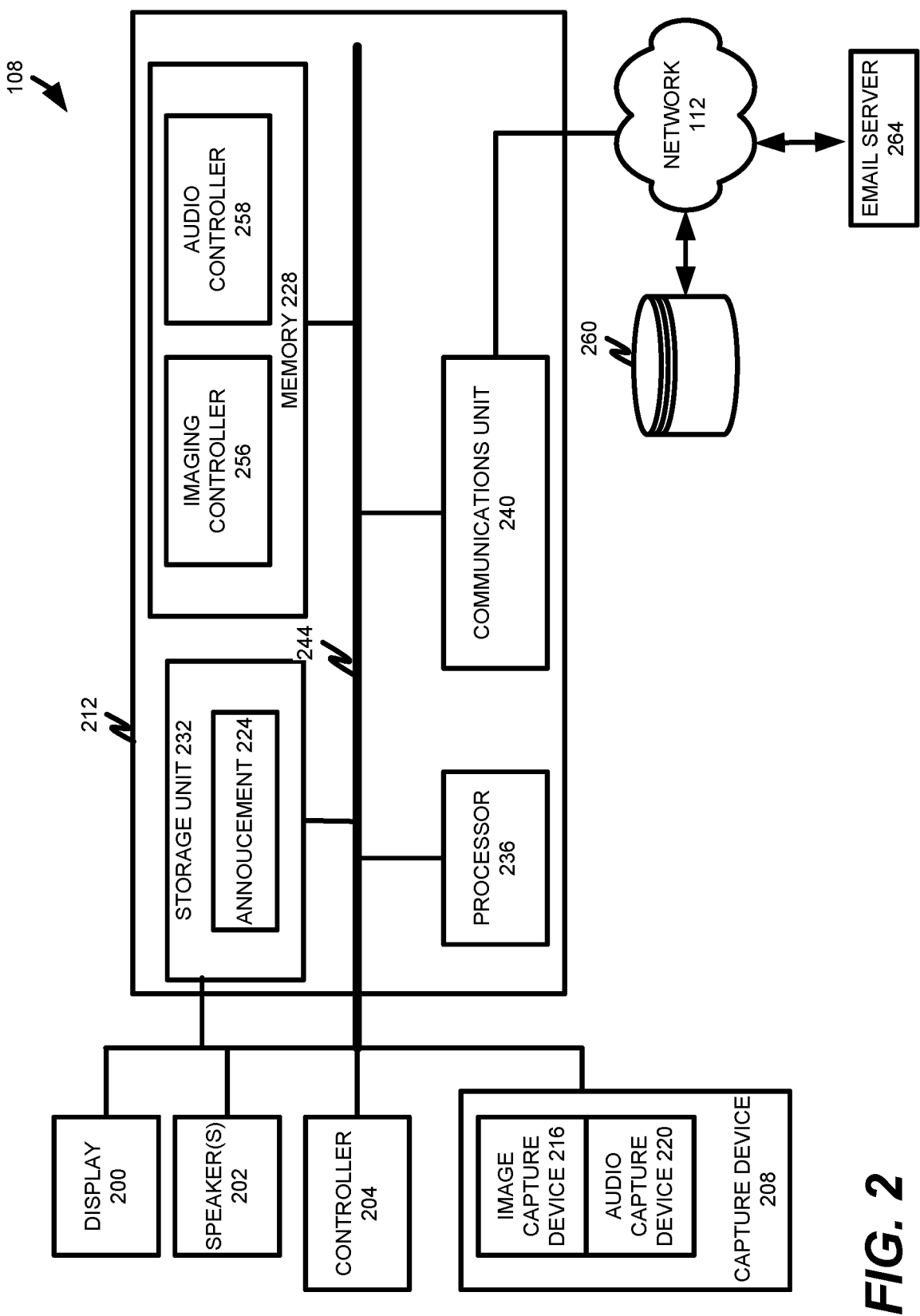
FIG. 2 depicts an endpoint in accordance with embodiments of the present disclosure.

With reference to FIG. 2, an exemplary endpoint is depicted. An exemplary endpoint 108 comprises a display device 200, a controller 204, a capture device 208, and a control unit 212.

The display device 200 can be any appropriate display or screen suitable to display an image stream received from the control unit 212. The display device 200 may display an image stream received at the control unit 212 from one of the remote video conferencing endpoints over the communications network 112. Alternatively, and/or additionally, the image stream received from the image capture device 208 may be displayed by the display device 200 and/or processed by the control unit 212 before transmission to the display device 200.

The controller 204 can be any type of input devices, such as a keyboard, a pointing device (e.g. mouse, trackball, pointing stick, etc.), a remote-control unit or a touchscreen device enabling a participant of the video conferencing room to interact with the control unit 212.

The capture device 208 can include an image capturing device 216, such as one or more still or video cameras capable of capturing 2-dimensional or 3-dimensional image information, and an audio capturing device 220, such as one or more microphones. The image capturing device 216 captures and provides image streams to the control unit 212. The audio capturing device 220 can comprise an array of microphones to capture and provide the audio streams to the control unit 212.

The control unit 212 generally comprises a memory 228, a storage unit 232, a processor 236 and a communications unit 240. The control unit 212 can communicate (e.g., exchange audio and video information and/or any additional data), over the communications network 112, with the other video conferencing endpoints and the network conference unit 104, access an enterprise database 260 comprising subscriber information, or interact with an enterprise email server 264 comprising subscriber email correspondence. This display device 200 can provide a command and control interface for the user.

The memory 228 can be any computer readable medium, such as a random-access memory (RAM) or other dynamic storage device (e.g. dynamic RAM, static RAM, synchronous RAM, etc.) coupled to a bus 244 for storing information and instructions to be executed by the processor 236. Additionally, the memory 228 may be used to store temporary variables and/or other intermediate information during the execution of instructions by processor 236. It will be appreciated by those skilled in the art that the memory 228 may be a single memory or split into a plurality of memories. For example, a further memory may be provided such as a read only memory (ROM) or any other static storage (e.g. programmable ROM, erasable programmable ROM, and electrically erasable programmable ROM, etc.) coupled to the bus for storing static information and instructions for the processor 236. Included in the memory 228 of the control unit 212 are an imaging controller 256 and an audio controller 258.

The storage unit 232 can be a further computer readable medium, such as a magnetic hard disk, or a removable media drive (e.g. floppy disc drive, read-only compact disc drive, read/write compact disc drive, compact disc jukebox, tape drive, and removable magneto-optical drive), etc. coupled to the bus for storing other information and/or instructions.

The processor 236 can process any command received from a conferencing user, triggered by the endpoint 108 or received from the communications network 112 (e.g. from the network conference unit 104 and/or from another conferencing endpoint 108). In response to a received command, the processor 236 can retrieve and execute the relevant set(s) of instructions from the memory 228 and/or the storage unit 232. Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture. Those skilled in the art will appreciate that the present disclosure is not limited to this single processor arrangement but that one or more processors in a multi-processor arrangement may be employed to execute the set(s) of instructions retrieved from one of the memories.

Finally, the communications unit 240 is generally a communication interface providing a two-way communication coupling between the endpoint 108 and the communications network 112. The communications unit 240 can receive any type of data information from the different devices of the endpoint 108 such as the display device 200, the controller 204, and the capture device 208 and pass the data information to the processor 236 for further processing and/or to other endpoints of the conferencing system 100 over the communications network 112. Also, the communications unit 240 can receive any additional data information received by an additional or alternative device present in the endpoint 108. The communication unit 240 can exchange (e.g. transmit and receive) any suitable type of data information with a plurality of devices coupled to the control unit 212 and exchange information with remote endpoints 108 or the network conference unit 104 of the conferencing system 100 over the communications network 112.

The announcement unit 224 plays a context-based announcement to specific participants during an active communication session. The announcement unit 224 receives the context-based announcement for a participant while the participant is in the active communication session. The announcement unit 224 also monitors the communication session, to determine a time when the context-based announcement should be played to the participant, and plays the context-based announcement to the participant at the determined time. The announcement unit 224 may also display to the participant a visual alert associated with the context-based announcement, the visual alert may include controls that allows the participant to select when the announcement is played. The announcement unit 224 may access a set of rules, and determine based on rules when to play an announcement and/or when to display a visual alert.

In one example, a student or professor may have multiple consecutive classes that are held online. One of the classes may be rescheduled or canceled, any attendees of the rescheduled canceled class will need to be notified. If some of the attendees are currently in another class, those attendees may be notified of the new time/cancelation during the class they are currently in. This elevates the need to students/professors to continuously monitor other information sources (e.g., email, SMS, etc.) in order to receive updates. The announcement may be placed as a background clip or played via a whisper channel only audible to the attendees that are affected by the announcement to ensure there is no interruption to the active communication session. Announcements may also be controlled by a session host (e.g., the professor).

In another example, conference attendees may register for consecutive webinar sessions. Conference attendees may also have multiple sessions they would like to attend and may select a certain session based on the speaker. If there is a change in speaker, the attendee may decide to attend a different session. However, if the attendee does not realize there has been a change until they are in the session, they may not be able to attend the other session. Therefore, conference attendees would appreciate being notified of changes to a session presenter prior to the beginning of the session. The present disclosure allows conference attendees to be notified of such changes and to modify their plans accordingly. The present disclosure achieves this by playing an announcement regarding the change in presenter in background of a currently active video call.

In another example, the system may be implemented in a hospital. The system may continuously poll emergency announcements and may play the audio for on duty professionals (e.g., doctors, nurses, combinations thereof, and/or the like). In some embodiments, the emergency announcements may correspond to routine announcements provided by receptionists. The emergency announcements may occur at specific times (e.g., at the top of the hour) and/or at certain time intervals (e.g., every 15 mins, every half hour, etc.). The emergency announcement may be stored (e.g., in an enterprise database 260), and personalized to each individual when played. For example, an announcement player (e.g., contextBasedAudioPlayerAPI) stores the recorded audio clip (e.g., runtime announcements by a hospital receptionist) with each individuals' name to receive the announcement. The announcement player may be integrated with all employees' calendars to identify if each recipient is in any active video call. If the announcement player determines a recipient is in an active call, the announcement player may further access the meeting credentials to make the announcement and recipient's name available to a virtual participant. This way the system can identify in which active call the emergency announcement should be played and for which doctor. such that each emergency announcement may be personalized for an individual (e.g., a physician). For example, each physician may have a specific emergency announcement containing her specific name. The system and/or components thereof may be integrated with additional hospital resources and/or individual resources (e.g., a specific physician's calendar). The integration may allow the system to determine, for example, when the individual is available or otherwise occupied (e.g., in an active video call). In examples where the individual (e.g., a physician) is in a conference session, the system may be able to connect the announcement to the conference call (described herein) and play the emergency announcement in the conference session. The use of the emergency announcement in the conference call may allow the physician to become aware of an emergency. In some embodiments, the system may access the emergency announcement and modify the emergency announcement to include information associated with the individual (e.g., the physician's name). In some embodiments, the emergency announcement may be made in other locations in addition to the conference call (e.g., over the loudspeaker at the hospital). In such embodiments, the system may identify the emergency announcement as well as the intended recipient and determine if the intended recipient is in a conference call. The system may then play the emergency announcement in the conference call for the intended recipient.

In another example, the system may be utilized for e-celebrations (e.g., celebrations occurring over electronic forms of communication). The system may be configured to read a participant profile and obtain information related to the participant (e.g., name, birthday, etc.) and may use the information to play specific audio notifications in a conference call. For instance, the system may determine that a user in a video call has a birthday on the day of the conference call. The system may then automatically access the video call and play a happy birthday song, a happy birthday background tune, or the like. The system may play the tune before, during, and/or after the user joins the video call. In some embodiments, the system may only begin playing the tune once the user with the birthday joins the call, after the majority of the participants have arrived in the video call, and/or combinations thereof. The system may define a minimum number of participants to begin playing the tune.

In another example, the present disclosure plays vital role in crisis management by playing emergency notification (e.g., fire alarms) in background of an active call.

The present disclosure provides a dynamic context driven approach of playing background audio and addresses announcements to specific users, further announcements and the current state of the communication session are evaluated to determine an optimal time to paly the announcement. In some examples, the announcement requires immediate attention. In other examples, the announcement is not time sensitive. Announcement may be host controlled or can be automatically played, depending on the selected configuration option.

The present disclosure may be implemented as feature with any audio/video communications application that allows you to set up virtual video and/or audio conferencing, webinars, live chats, screen-sharing, and other collaborative capabilities.

The present disclosure may implement a virtual participant to pick up and play the right audio stream depending on context/events/time. This is achieved by programmatic entry of virtual participant in any active video call. This virtual participant will be capable enough to read an external interface integrated with conferencing server. This external interface will act as an input feed to the virtual participant, availing all the necessary inputs to the virtual participant—as active conferencing meet details, list of participants, profiles of participants etc. This external interface will access the dynamic audio stream, depending on context and provide the audio stream as an input to the virtual participant with information about when and where the announcement needs to be played. In some embodiments the announcement is played as background audio in an active session. The virtual participant is treated as and active participant in the call, and does not interrupt the communication between the participants to make the announcement. The announcement may comprise a pre-recorded message and/or a live message. In some embodiments, the present disclosure allows the scheduling of announcements. The scheduling may be a specific time, or a specific communication session, etc. Additional configurations allows the announcement to be play after a specific participant joins (e.g., advertising/marketing), to play when a defined quorum of participants is achieved, use selected, host controlled, etc. The system is intelligent enough to play the announcement as background audio depending on context/event information, to prevent communication interruption to the other participants (e.g., participants that do not need to hear the announcement).

The present disclosure also contemplates updates/alarms (which require immediate attention) to be shared in an ongoing active call. This helps attendees to instantly be informed about the matters which need immediate attention (e.g., fire alarms, emergency announcements, etc.).

If required, the method and system is intelligent determine whether the participants' immediate attention is required, and can play dynamic audio in background of any active call, to announce matters needing immediate attention, depending on context/event and does not interrupt the other participants, and eliminates the need for an external service to broadcast such announcements, which is advantageous over existing solutions.+

Figure 3:
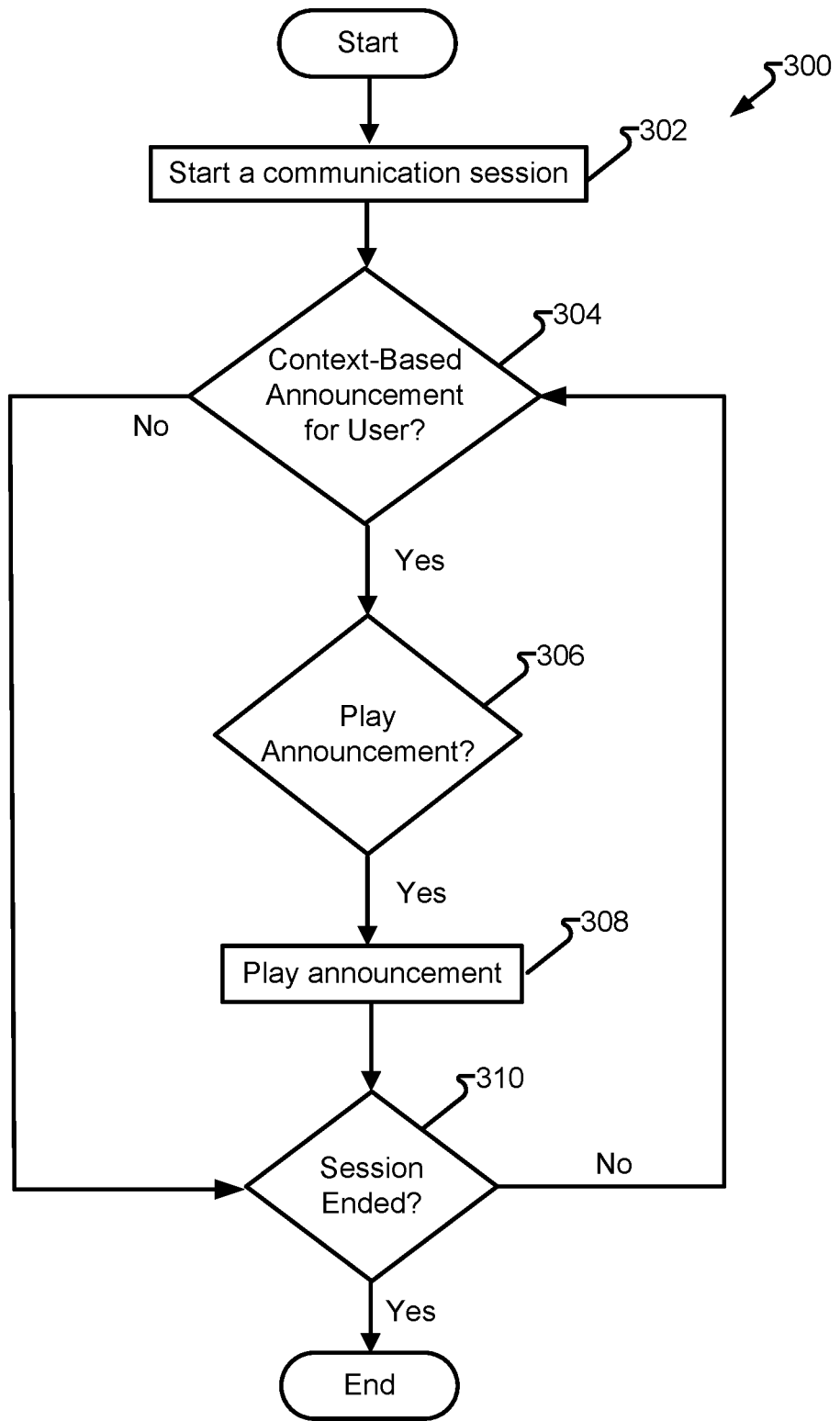
FIG. 3 depicts a process to play context-based announcements during a communication session in accordance with embodiments of the present disclosure.

FIG. 3 depicts a process 300 in accordance with embodiments of the present disclosure. The process 300 may be embodied as an algorithm encoded as machine-readable instructions that, when read by a processor, such as a processor of the endpoints 108A-N, cause the processor to execute the steps of the algorithm. In one embodiment, the process 300 causes a system (e.g., a system 100) to play context-based announcement during an active communication session on a particular endpoint 108.

In one embodiment, the process 300 starts with commencement of a communication session (Step 302). For example, in a video conferencing session each participant via an associated communication device (e.g., endpoint 108) receives and transmits conference content (e.g., an audio and a video portion). The conference content may be broadcast to participants 102A-N, such as by the network conference unit 104. Broadcasting conference content may be performed continuously, while other steps of process 300 are executed, until the conference is concluded.

In Step 304 the system and/or components thereof (e.g., endpoints 108 and/or system 104 and 106) determine whether a context-based announcement for a user of the communication session has been received. For example, the context-based announcement may be for one participant, some but not all participants, or all participants. If no context-based announcement has been received (No), the system checks to see if the communication session has ended. If the communication session has ended, the process 300 ends.

If a context-based announcement is received, the system determines whether the announcement should be played (Step 306). The system waits until the context-based announcement should be played (Yes) and then plays the context-based announcement to the intended participants (Step 308). The process 300 ends when the communication session ends. If the communication session has not ended, the system continues to monitor for context-based announcements, repeats Steps 304, 306, and 308, as needed, and process 300 ends when the communication session ends.

Figure 4:
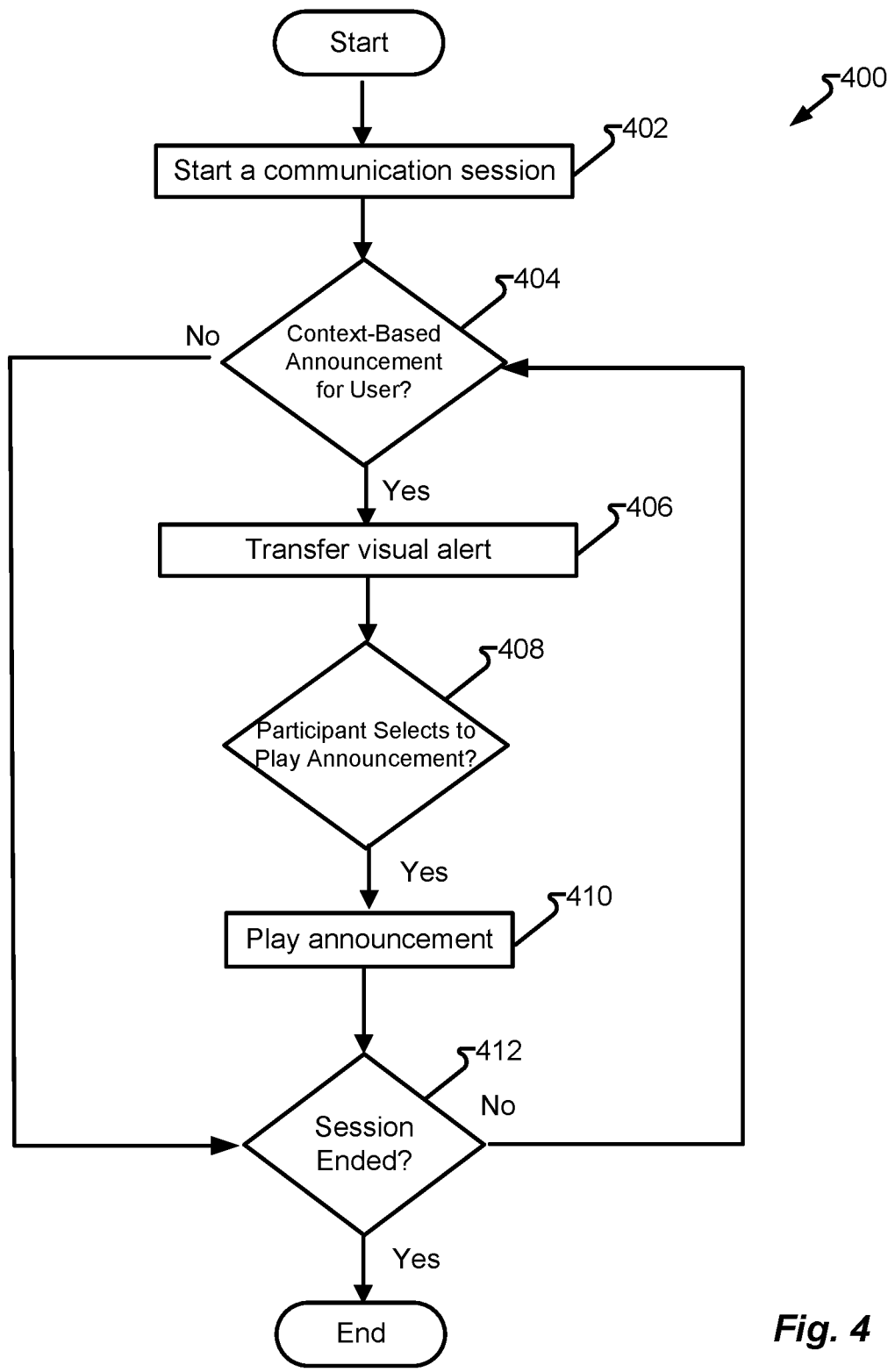
FIG. 4 depicts a process to play context-based announcements during a communication session in accordance with embodiments of the present disclosure.

FIG. 4 depicts a process 400 in accordance with embodiments of the present disclosure. The process 400 may be embodied as an algorithm encoded as machine-readable instructions that, when read by a processor, such as a processor of the endpoints 108A-N, cause the processor to execute the steps of the algorithm.

In one embodiment, the process 400 starts with commencement of a communication session (Step 402). For example, in a video conferencing session each participant via an associated communication device (e.g., endpoint 108) receives and transmits conference content (e.g., an audio and a video portion). The conference content may be broadcast to participants 102A-N, such as by the network conference unit 104. Broadcasting conference content may be performed continuously, while other steps of process 400 are executed, until the conference is concluded.

In Step 404 the system determines whether a context-based announcement for a user of the communication session has been received. For example, the context-based announcement may be for one participant, some but not all participants, or all participants. If no context-based announcement has been received (No), the system checks to see if the communication session has ended. If the communication session has ended, the process 400 ends.

If a context-based announcement is received, the system transfers a visual alert associated with the context-based announcement to the participant (Step 406). In Step 408, the system determines whether the participant has selected to play the announcement. If the user does not select to play the announcement (No) the system waits until the user selects to play the announcement (Yes), and in Step 410 the announcement is played. In some examples, the system may override the user's selection (e.g., an emergency notification is played immediately). The process 400 ends when the communication session ends. If the communication session has not ended, the system continues to monitor for context-based announcements, repeats Steps 404, 406, 408, and 410 as needed, and process 400 ends when the communication session ends.

Playing a context-based announcement to specific participants during an active communication session will be discussed more completely with respect to FIGS. 5-7.

Figure 5:
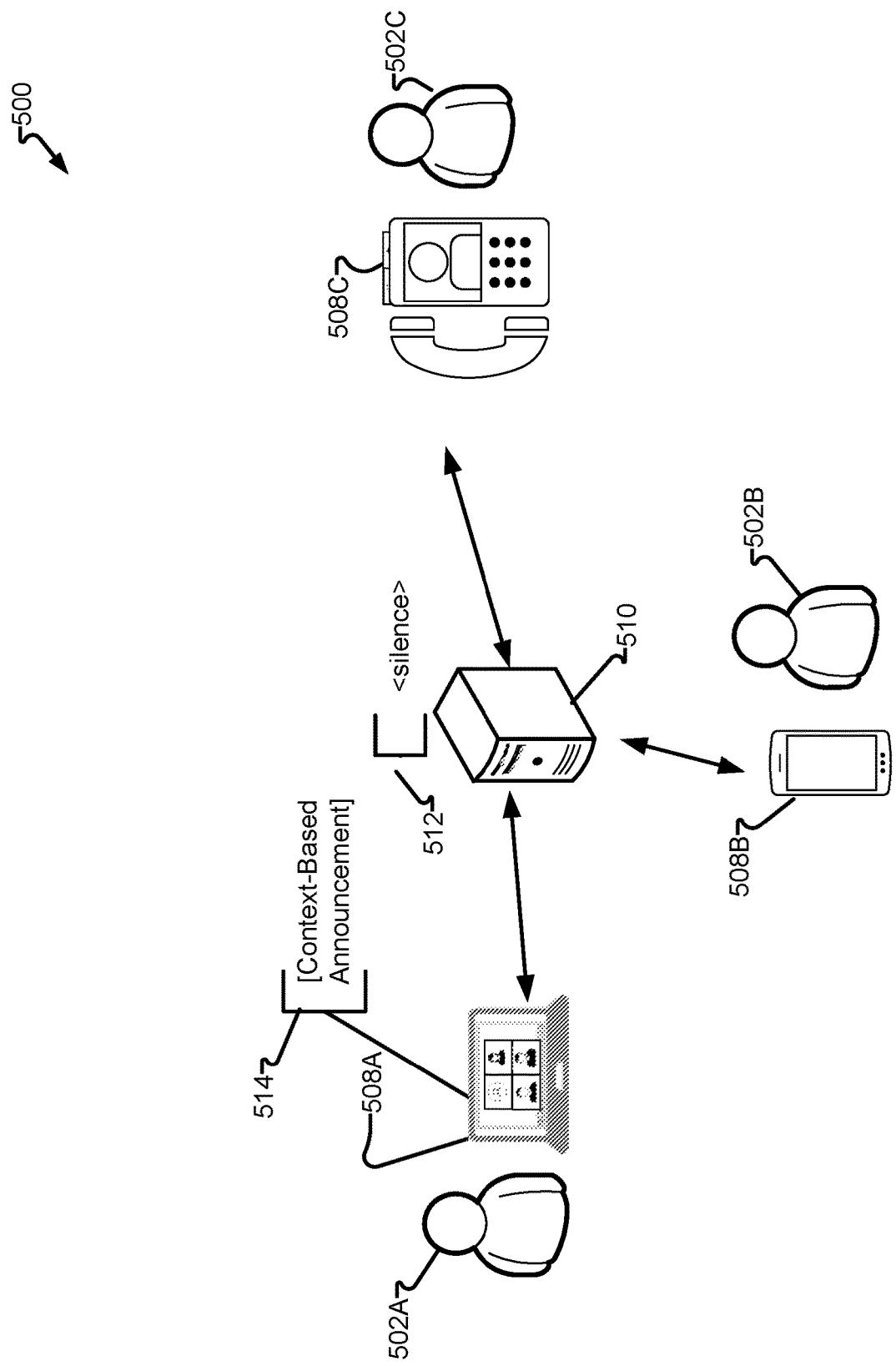
FIG. 5 depicts a system to play context-based announcements during a communication session in accordance with embodiments of the present disclosure.

FIG. 5 depicts an interaction 500 in accordance with embodiments of the present disclosure. It should be appreciated that the nature of this paper necessitates that spoken content and other sounds, which may be embodied as sound waves or as encoded electrical signals or data packets, be represented as text. This representation using text should not be confused with actual text (e.g., text chat, Short Message Service (SMS), email, etc.). While the sending and receiving of text may be optionally utilized and incorporated into the conference content, text-based communications are outside the scope of the embodiments provided herein.

In one embodiment, a server 510 is presenting conference content comprising audio and video content transmitted to participants 502A-C via a respective endpoint 508A-C. The video portion of the conference content is not depicted in FIG. 5 to avoid unnecessarily complicating the figure and associated description. The audio portion of the conference content comprises audio 512 and 514.

In one embodiment, the endpoint 508A provides the audio to the server 510, which in turn broadcasts the conference content 210. As indicated during a period of silence (510), the context-based announcement (514) is played.

Figure 6A:
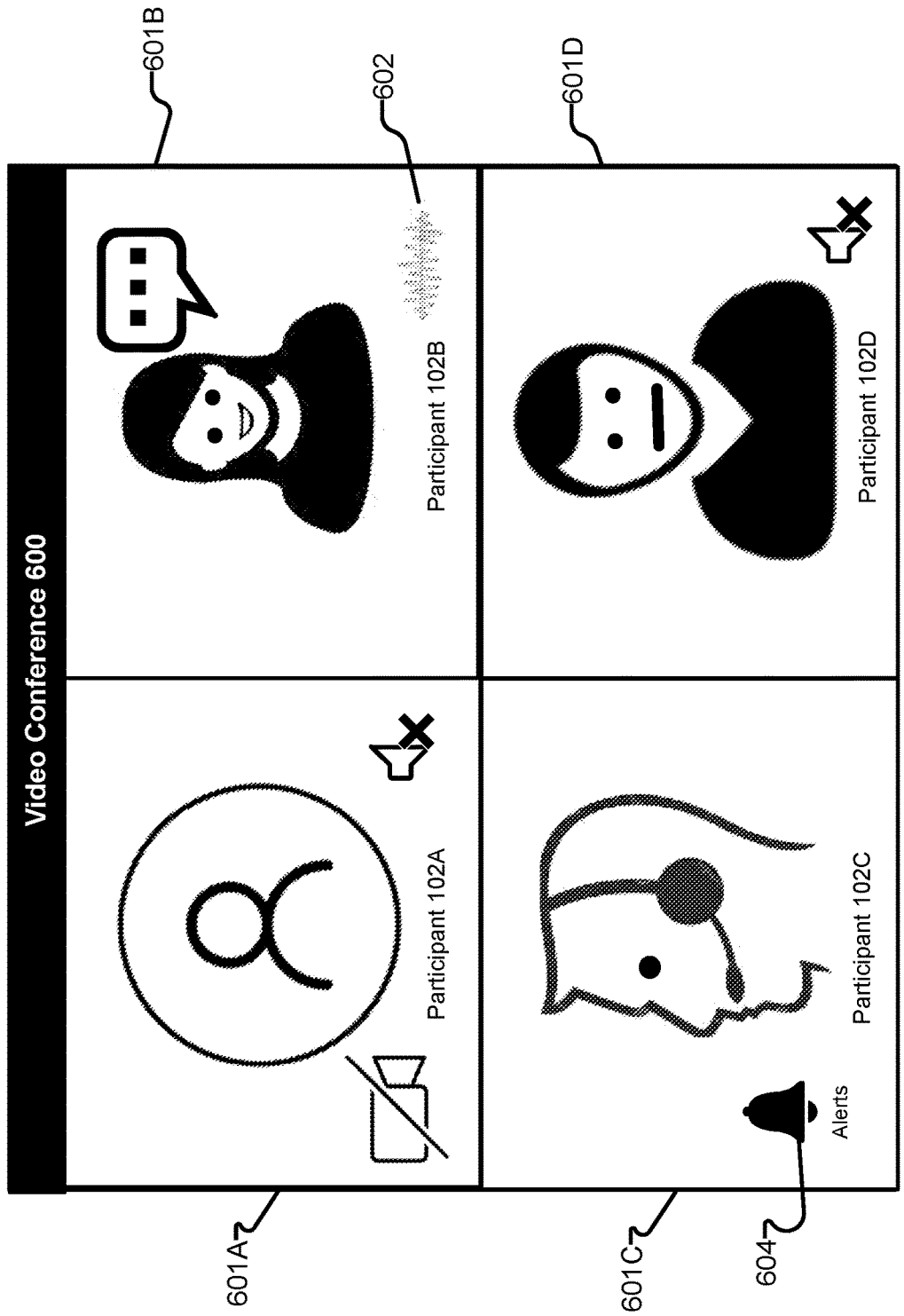
FIGS. 6A-B depicts a system to play context-based announcements during a communication session in accordance with embodiments of the present disclosure.
Figure 6B:
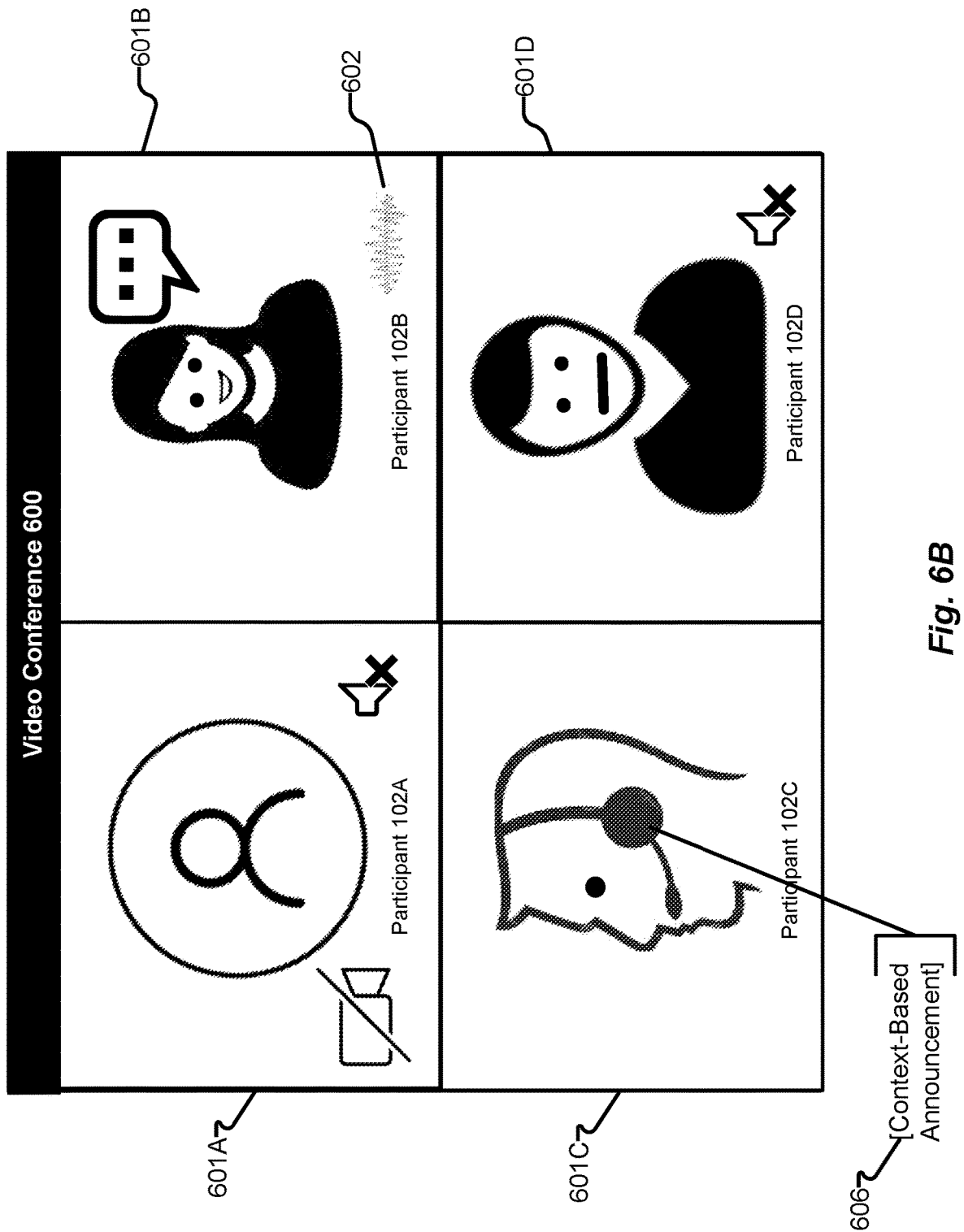

FIGS. 6A-6B depict a video conference 600. The video conference 600 includes participants 102A-D shown in conference windows 601A-D, respectively. The participants 102A-D are connected to the video conference 600 via respective endpoints 108A-D. The participant 102A as illustrated is not sharing video or audio. The participant 102B is sharing audio (e.g., as shown by an audio/noise indicator 602) and video, and is currently the active speaker in the video conference 600. The participant 102C is sharing video and audio (e.g., unmuted), but in not currently speaking/contributing audio. The participant 102D is sharing video but not audio (e.g., muted). The participant 102C receives a visual alert (604) notifying the participant 102C of a context-based announcement intended for participant 102C.

As illustrated in FIG. 6B, the participant 102C using the visual alert 604, the participant 102C has selected to play the context-based announcement 606 while participant 102B is speaking.

Figure 7:
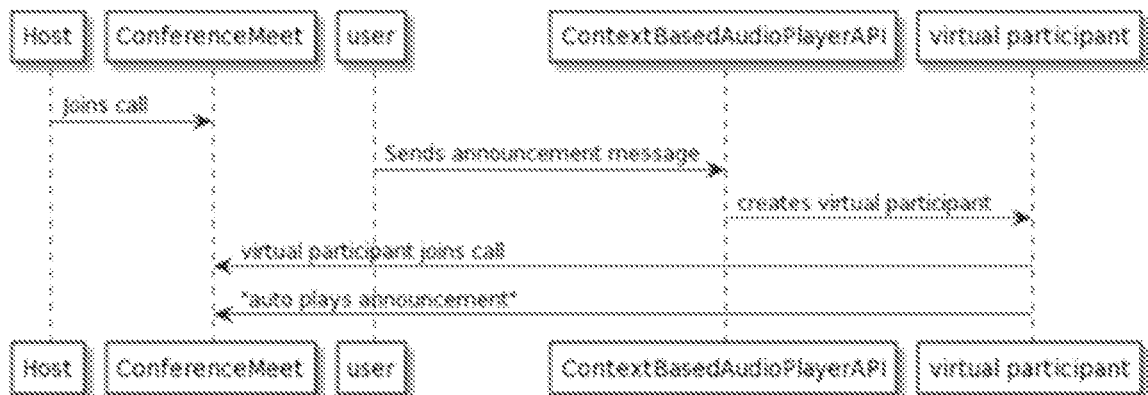
FIG. 7 depicts a system to play context-based announcements during a communication session in accordance with embodiments of the present disclosure.
Figure 7:
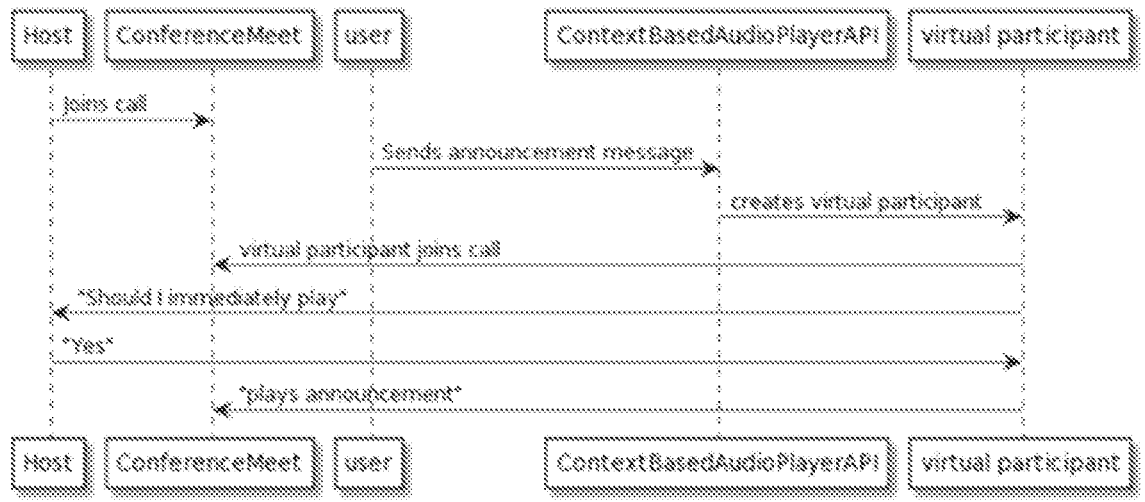

FIG. 7 depicts various configurations to play context-based announcements as background audio.

Figure 8:
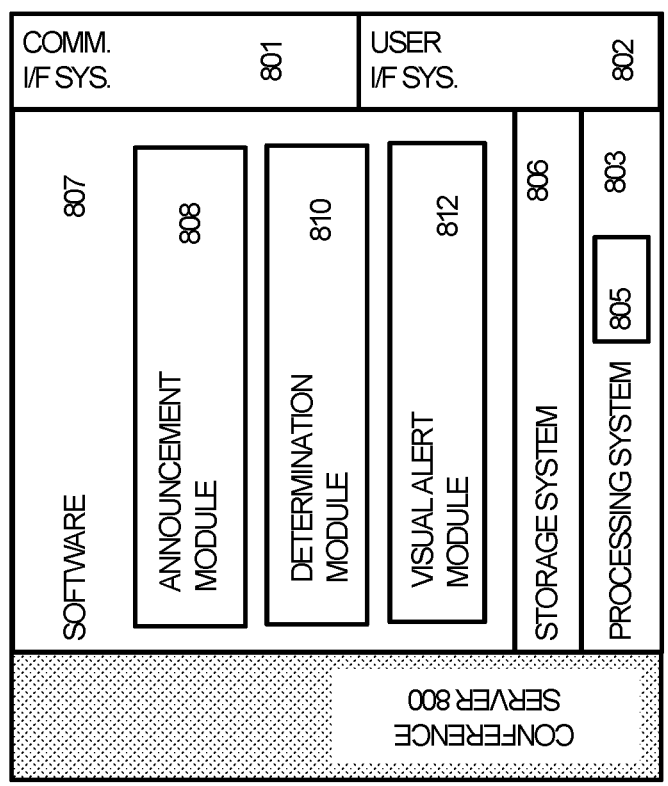
FIG. 8 depicts a computing system to optimize user presentation during a video conferencing session in accordance with embodiments of the present disclosure.

FIG. 8 depicts a communication device 800 in accordance with embodiments of the present disclosure. The communication device 800 plays a context-based announcement during an active communication session. The communication device 800 receives the context-based announcement for an associated participant while the participant is in an active communication session. The communication device 800 monitors the communication session, to determine a time when the context-based announcement should be played, and plays the context-based announcement at the determined time. The communication device 800 may also display to the user a visual alert associated with the context-based announcement, the visual alert may include controls that allows the user to select when the announcement is played. Similar computing systems may be included in endpoints 108A-N, in whole or in part, described herein to play a context-based announcement during an active communication session.

A computing system 800 is representative of any computing system or systems with which the various operational architectures, processes, scenarios, and sequences disclosed herein to play a context-based announcement during an active communication session, comprising various components and connections to other components and/or systems.

The computing system 800 is an example of the endpoints 108A-N and communication devices 308A-D, although other examples may exist. The computing system 800 comprises a communication interface 801, a user interface module 802, and a processing system 803. The processing system 803 is linked to the communication interface 801 and user interface module 802. The processing system 803 includes a microprocessor and/or processing circuitry 805 and a storage system 806 that stores operating software 807. The computing system 800 may include other well-known components such as a battery and enclosure that are not shown for clarity. The computing system 800 may comprise a server, a user device, a desktop computer, a laptop computer, a tablet computing device, or some other user communication apparatus.

The communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In some implementations, the communication interface 801 is configured to communicate with other end user devices, wherein the communication interface 801 is used to transfer and receive voice and video communications for the devices. Further, the communication interface 801 may interface with a webservice, wherein the service may comprise a video conferencing service that can be accessed via a website.

The user interface module 802 comprises components that interact with a user to present media and/or information (e.g., alerts), receive events coming from a participant endpoint application, and also allow a user to configure settings of the display optimization. The user interface module 802 may include a speaker, microphone, buttons, lights, display screen, touch screen, touch pad, scroll wheel, communication port, or some other user input/output apparatus—including combinations thereof. The user interface module 802 may be omitted in some examples.

The processing circuitry 805 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via a bus, executes instructions, and outputs data, again such as via the bus. In other embodiments, the processing circuitry 805 may comprise a shared processing device that may be utilized by other processes and/or process owners, such as in a processing array or distributed processing system (e.g., "cloud," farm, etc.). It should be appreciated that the processing circuitry 805 is a non-transitory computing device (e.g., electronic machine comprising circuitry and connections to communicate with other components and devices). The processing circuitry 805 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor and the hardware and other circuitry thereof.

The processing circuitry 805 comprises a microprocessor and other circuitry that retrieves and executes the operating software 807 from the storage system 806. The storage system 806 may include volatile and nonvolatile, removable and non-removable media implemented in any method or technology for storage of information, such as computer readable instructions, data structures, program modules, or other data. The storage system 806 may be implemented as a single storage device, but may also be implemented across multiple storage devices or sub-systems. The storage system 806 may comprise additional elements, such as a controller to read the operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

The processing circuitry 805 is typically mounted on a circuit board that may also hold the storage system 806 and portions of the communication interface 801 and the user interface module 802. The operating software 807 comprises computer programs, firmware, or some other form of machine-readable program instructions. The operating software 807 includes an announcement module 808, a determination module 810, and a visual alert module 812, although any number of software modules within the application may provide the same operation. The operating software 807 may further include an operating system, utilities, drivers, network interfaces, applications, or some other type of software. When executed by the processing circuitry 805, the operating software 807 directs the processing system 803 to operate the communication device 800 as described herein.

In at least one implementation, the announcement module 808, when read and executed by the processing system 803, directs the processing system 803 to monitor for context-based announcements for users in active communication session. For example, if a class is canceled, the system determines which students should receive the cancelation notification and determines whether any of the students are in an active communication session. For the students in an active communication session, an announcement is sent to each respective active session. The determination module 810 when read and executed by the processing system 803, directs the processing system 803 to determine a time to play the announcement. For example, if the announcement is an emergency notification, the system determines that the emergency notification should be played immediately. If the announcement is not an emergency notification, the system determines the most optimal time to play the announcement. The most optimal time may be when no one is speaking or when the user is not speaking. In some embodiments the host may initiate the announcement. The visual alert module 812, when read and executed by the processing system 803, directs the processing system 803 to transfer a visual alert to the user associated with the context-based announcement, the user may be able to indicate when to play the announcement (e.g., play immediately, play later, etc.).

It should be appreciated that computer readable data may be sent, received, stored, processed, and presented by a variety of components. It should also be appreciated that components illustrated may control other components, whether illustrated herein or otherwise.

Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits.

Additionally, or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof). Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to communications systems and components and methods for improving the visual presentation of a user during a video conference. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

For example, in one alternative embodiment, a system comprising:
a microprocessor; and
a computer readable medium, coupled with the microprocessor and comprising microprocessor readable and executable instructions that program the microprocessor to:
receive context-based announcement for a participant of a communication session;
monitor the communication session, to determine a time when the context-based announcement should be played; and
play the context-based announcement at the determined time.

Aspects of the embodiment include playing the context-based announcement on an audio whisper channel only audible to a participant associated with the context-based announcement.

Aspects of the embodiment include an audio communication session.

Aspects of the embodiment include a video conferencing communication session.

Aspects of the embodiment include an emergency notification that is played immediately.

Aspects of the embodiment include generating a virtual participant, adding the virtual participant to the communication session, and playing the context-based announcement via the virtual participant.

Aspects of the embodiment include determining when there is no active speaker speaking in the communication session, and playing the context-based announcement when there is no active speaker in the communication session.

Aspects of the embodiment include transferring a visual alert associated with the context-based announcement, and allowing the participant to select whether or not to play the context-based announcement.

In another alternative embodiment, a method to play context-based announcement in a communication session, the method comprising:
during the communication session, receiving a context-based announcement for a participant of the communication session;
monitoring the communication session, to determine a time when the context-based announcement should be played; and
playing the context-based announcement at the determined time.

In another alternative embodiment, a non-transitory computer-readable medium comprising processor-executable instructions, the processor-executable instructions comprising:

instructions configured to receive context-based announcement for a participant of a communication session;

instructions configured to monitor the communication session, to determine a time when the context-based announcement should be played; and instructions configured to play the context-based announcement at the determined time.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that program the microprocessor to:
receive a context-based announcement intended for at least one participant of a communication session, wherein the context-based announcement is from a user that is not a participant of the communication session;
generate a virtual participant to be added to the communication session;
monitor the communication session, to determine a time to play the context-based announcement to the intended at least one participant based on a determined context of the communication session, wherein the context-based announcement is played without instruction from a participant; and
play, via the generated virtual participant, the context-based announcement to the intended at least one participant at the determined time.

2. The system of claim 1, wherein the context-based announcement is played on an audio whisper channel only audible to the intended at least one participant associated with the context-based announcement.

3. The system of claim 1, wherein the communication session comprises an audio communication session.

4. The system of claim 1, wherein the communication session comprises a video conferencing communication session.

5. The system of claim 1, wherein the context-based announcement comprises an emergency notification, and wherein the emergency notification is played immediately.

6. The system of claim 1, further comprising instructions that program the microprocessor to:
monitor the communication session to determine when there is no active speaker speaking in the communication session; and
play the context-based announcement when there is no active speaker speaking in the communication session.

7. The system of claim 1, further comprising instructions that program the microprocessor to:
transfer a visual alert associated with the context-based announcement to the intended at least one participant; and
allow each of the intended at least one participant to select whether or not to play the context-based announcement.

8. A method to play a context-based announcement in a communication session, the method comprising:
during the communication session, receiving the context-based announcement intended for at least one participant of the communication session, wherein the context-based announcement is from a user that is not a participant of the communication session;
generating a virtual participant to be added to the communication session;
monitoring the communication session, to determine a time to play the context-based announcement to the intended at least one participant based on a determined context of the communication session, wherein the context-based announcement is played without instruction from a participant; and
playing, via the generated virtual participant, the context-based announcement to the intended at least one participant at the determined time.

9. The method of claim 8, wherein the context-based announcement is played on an audio whisper channel only audible to the intended at least one participant associated with the context-based announcement.

10. The method of claim 8, wherein the communication session comprises an audio communication session.

11. The method of claim 8, wherein the communication session comprises a video conferencing communication session.

12. The method of claim 8, wherein the context-based announcement comprises an emergency notification, and wherein the emergency notification is played immediately.

13. The method of claim 8, further comprising:
monitoring the communication session to determine when there is no active speaker speaking in the communication session; and
playing the context-based announcement to the intended at least one participant when there is no active speaker speaking in the communication session.

14. The method of claim 8, further comprising:
transferring a visual alert associated with the context-based announcement to the intended at least one participant associated with the context-based announcement; and
allowing each of the intended at least one participant to select whether or not to immediately play the context-based announcement.

15. A non-transitory computer-readable medium comprising processor-executable instructions, the processor-executable instructions comprising:
instructions configured to receive a context-based announcement intended for at least one participant of an active communication session, wherein the context-based announcement is from a user that is not a participant of the active communication session;
instructions configured to generate a virtual participant to be added to the active communication session;
instructions configured to monitor the active communication session, to determine a time to play the context-based announcement to the intended at least one participant based on a determined context of the active communication session, wherein the context-based announcement is played without instruction from a participant; and
instructions configured to play, via the generated virtual participant, the context-based announcement to the intended at least one participant at the determined time.

16. The non-transitory computer-readable medium of claim 15, the processor-executable instructions further comprising:
instructions configured to play the context-based announcement to the intended at least one participant on an audio whisper channel only audible to the intended at least one participant associated with the context-based announcement.

17. The non-transitory computer-readable medium of claim 15, the processor-executable instructions further comprising:
instructions configured to determine that the context-based announcement is an emergency notification; and
instructions configured to immediately play the emergency notification.

* * * * *